US012629801B2

(12) United States Patent
Rusch et al.

(10) Patent No.: US 12,629,801 B2
(45) Date of Patent: May 19, 2026

(54) IMPACT TOOL AND ANVIL WITH BLIND HOLE TOOL ELEMENT RETENTION

(71) Applicant: MILWAUKEE ELECTRIC TOOL CORPORATION, Brookfield, WI (US)

(72) Inventors: Eric M. Rusch, Jackson, WI (US); Jacob P. Schneider, Cedarburg, WI (US); Mackenzie J. Nick, Theresa, WI (US); Andrew D. Bendtsen, Oak Creek, WI (US); Anton J. Gumina, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 70 days.

(21) Appl. No.: 18/171,087

(22) Filed: Feb. 17, 2023

(65) Prior Publication Data

US 2024/0278393 A1 Aug. 22, 2024

Related U.S. Application Data

(60) Provisional application No. 63/311,107, filed on Feb. 17, 2022.

(51) Int. Cl.
*B25B 21/02* (2006.01)
*B25B 23/00* (2006.01)

(52) U.S. Cl.
CPC .......... *B25B 21/02* (2013.01); *B25B 23/0035* (2013.01)

(58) Field of Classification Search
CPC ............................ B25B 23/0035; B25B 21/02
See application file for complete search history.

(56) References Cited

U.S. PATENT DOCUMENTS 4,266,453 A * 5/1981 Farley ................. B25B 23/0035 81/177.85
4,477,096 A 10/1984 Wallace et al.
4,583,430 A 4/1986 Farley
4,627,761 A * 12/1986 Olson ................. B25B 23/0035 81/177.85

(Continued)

FOREIGN PATENT DOCUMENTS

EP 0779130 A1 6/1997
EP 2623000 A1 * 8/2013 .......... A47J 43/0705
WO 2017144427 A1 8/2017

OTHER PUBLICATIONS

Translation of EP 2623000 A1 (Year: 2013).*

*Primary Examiner* — Thomas M Wittenschlaeger
(74) *Attorney, Agent, or Firm* — Michael Best & Friedrich LLP

(57) ABSTRACT

An impact tool includes a housing, a motor supported within the housing, an anvil extending from the housing, the anvil including a body rotatable about a longitudinal axis, a drive end portion configured to receive a tool element over a distal end thereof, and a blind bore extending partially through the drive end portion of the anvil in a direction transverse to the longitudinal axis. The impact tool also includes a retainer configured to at least partially surround the tool element, the retainer having a post configured to extend through the tool element and into the blind bore to inhibit removal of the tool element from the distal end of the anvil, and a drive assembly configured to convert a continuous rotational input from the motor to intermittent applications of torque to the anvil.

20 Claims, 6 Drawing Sheets

(56) References Cited

U.S. PATENT DOCUMENTS

| | | | | |
|---|---|---|---|---|
| 5,085,548 | A * | 2/1992 | Moyles .................. | F16B 39/32 411/522 |
| 5,470,180 | A | 11/1995 | Jore | |
| 5,779,404 | A | 7/1998 | Jore | |
| 5,954,463 | A | 9/1999 | Jore | |
| 5,974,919 | A | 11/1999 | Habele | |
| 6,076,436 | A | 6/2000 | Farley | |
| 6,176,654 | B1 | 1/2001 | Jore | |
| 7,077,033 | B2 | 7/2006 | Hirakata | |
| 7,363,840 | B1 | 4/2008 | Farley | |
| 9,358,671 | B2 | 6/2016 | Lin | |
| 9,469,020 | B2 | 10/2016 | Funk et al. | |
| 2007/0044596 | A1 | 3/2007 | Chen | |
| 2021/0362308 | A1* | 11/2021 | Li .......................... | B25D 11/04 |

* cited by examiner

IMPACT TOOL AND ANVIL WITH BLIND HOLE TOOL ELEMENT RETENTION

CROSS-REFERENCE TO RELATED APPLICATIONS

This application claims priority to U.S. Provisional Patent Application No. 63/311,107, filed Feb. 17, 2022, the entire contents of which are incorporated herein by reference.

FIELD

The present disclosure relates to impact tools. More particularly, the present disclosure relates to anvils for impact tools and to the retention of tool elements (e.g., bits, sockets, and/or the like) to such anvils.

BACKGROUND

Impact tools, such as impact wrenches, provide a striking rotational force, or intermittent applications of torque, to a tool element or workpiece (e.g., a fastener) to either tighten or loosen the fastener. Impact wrenches are typically used where high torque is needed, such as to tighten relatively large fasteners or to loosen or remove stuck fasteners (e.g., an automobile lug nut on an axle stud) that are otherwise not removable or very difficult to remove using hand tools.

SUMMARY

One independent aspect of the disclosure provides an impact tool including a housing, a motor supported within the housing, an anvil extending from the housing, the anvil including a body rotatable about a longitudinal axis, a drive end portion configured to receive a tool element over a distal end thereof, and a blind bore extending partially through the drive end portion of the anvil in a direction transverse to the longitudinal axis. The impact tool also includes a retainer configured to at least partially surround the tool element, the retainer having a post configured to extend through the tool element and into the blind bore to inhibit removal of the tool element from the distal end of the anvil, and a drive assembly configured to convert a continuous rotational input from the motor to intermittent applications of torque to the anvil.

Another independent aspect of the disclosure provides an anvil for an impact tool, the anvil including a body rotatable about a longitudinal axis, a drive end portion configured to receive a tool element over a distal end thereof, a blind bore extending partially through the drive end portion of the anvil in a direction transverse to the longitudinal axis, and a retainer configured to at least partially surround the tool element, the retainer having a post configured to extend through the tool element and into the blind bore to inhibit removal of the tool element from the distal end of the anvil.

Another independent aspect of the disclosure provides an impact tool including a housing, a motor supported within the housing, and an anvil extending from the housing, the anvil including a body rotatable about a longitudinal axis, a drive end portion configured to couple to a tool element, the tool element including an opening, and a blind bore extending partially through the drive end portion of the anvil. The blind bore is configured to align with the opening in the tool element when the tool element is coupled to the drive end portion. The impact tool also includes a retainer configured to at least partially surround the tool element, the retainer having a post configured to extend through the opening and into the blind bore to inhibit removal of the tool element from the drive end portion of the anvil, and a drive assembly configured to convert a continuous rotational input from the motor to intermittent applications of torque to the anvil.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
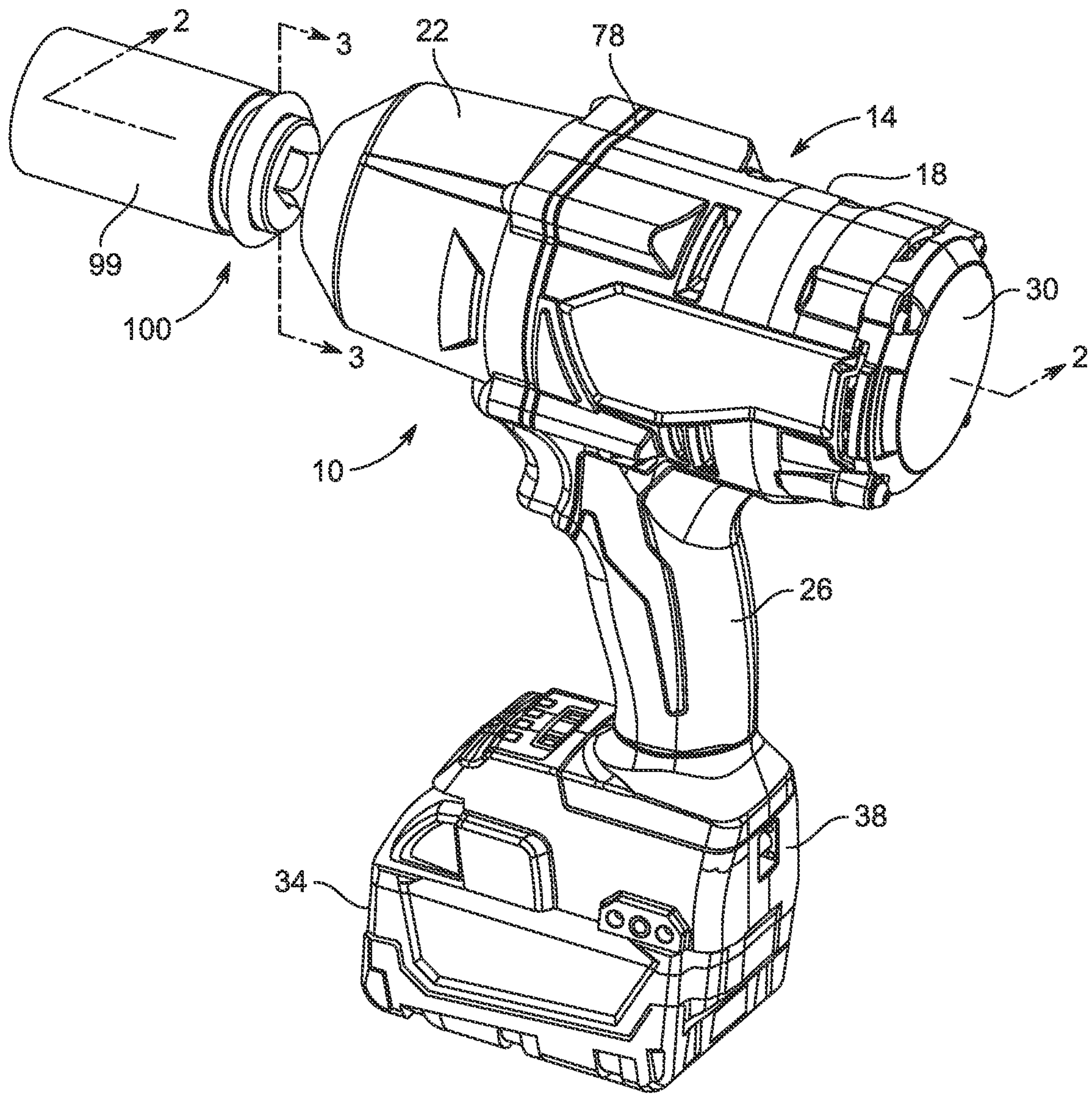
FIG. 1 is a perspective view of an impact tool according to an embodiment of the present disclosure.

FIG. 1 illustrates an impact tool 10 in the form of an impact wrench. The impact wrench 10 includes a housing 14 with a motor housing portion 18, a front housing portion 22 coupled to the motor housing portion 18 (e.g., by a plurality of fasteners), and a handle portion 26 extending downward from the motor housing portion 18. In the illustrated embodiment, the handle portion 26 and the motor housing portion 18 are defined by cooperating clamshell halves. The illustrated housing 14 also includes an end cap 30 coupled to the motor housing portion 18 opposite the front housing portion 22.

Figure 2:
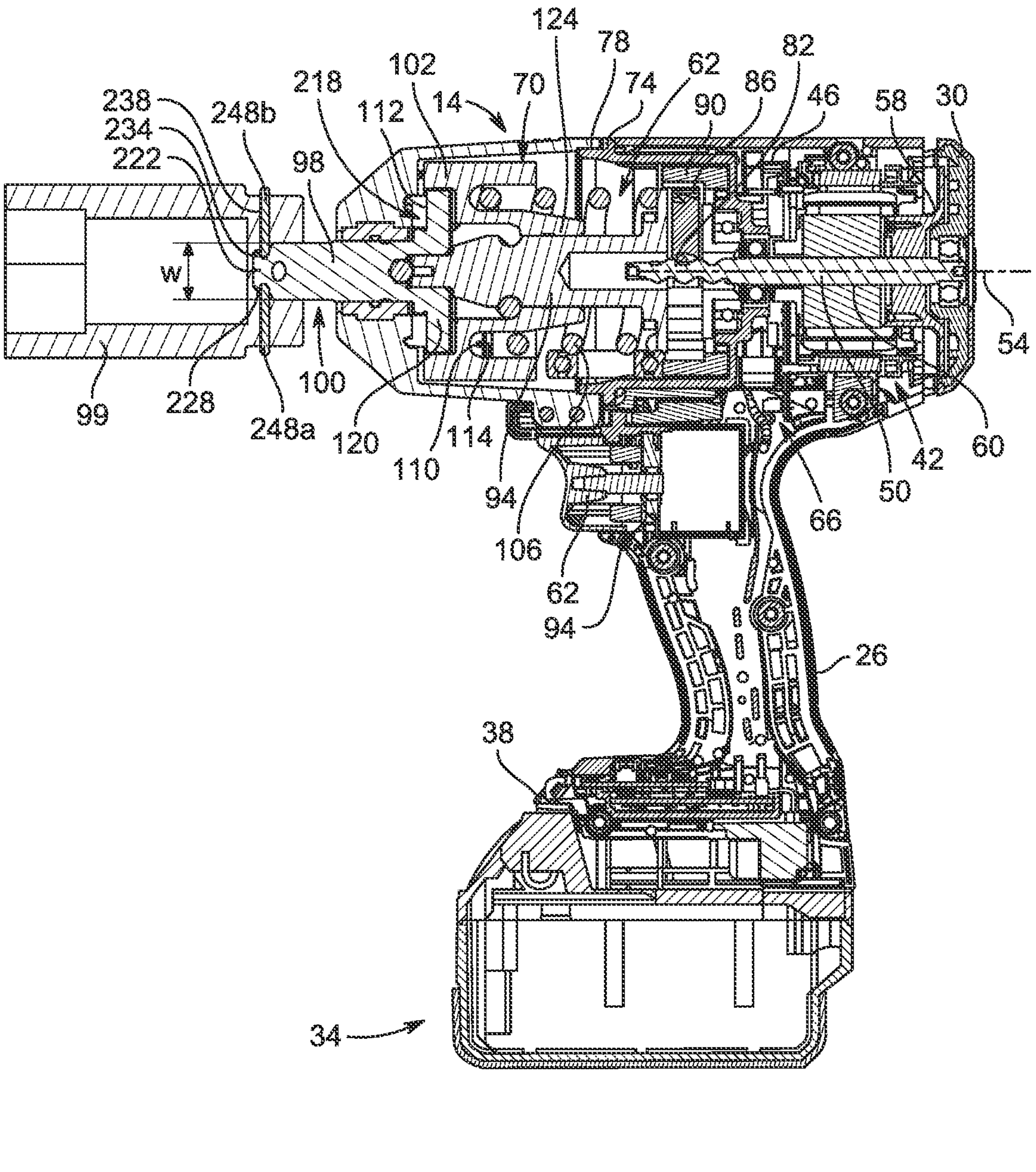
FIG. 2 is a cross-sectional view of the impact tool of FIG. 1, taken along line 2-2 in FIG. 1, illustrating a tool element retainer assembly that is usable with the impact tool.

Referring to FIGS. 1 and 2, the impact wrench 10 has a battery 34 removably coupled to a battery receptacle 38 located at a bottom end of the handle portion 26. A motor 42, supported within the motor housing portion 18, receives power from the battery 34 via the battery receptacle 38 when the battery 34 is coupled to the battery receptacle 38. In the illustrated embodiment, the motor 42 is a brushless direct current ("BLDC") electric motor with a stator 46 and rotor or output shaft 50 that is rotatable about an axis 54 relative to the stator 46. In other embodiments, other types of motors may be used. A fan 58 is coupled to the output shaft 50 (e.g., via a splined member 60 fixed to the output shaft 50) behind the motor 42.

The impact wrench 10 also includes a switch (e.g., trigger switch 62) supported by the housing 14 for operating the motor 42 (e.g., via suitable control circuitry provided on one or more printed circuit board assemblies ("PCBAs") that control power supply and command of the motor 42. In other embodiments, the impact wrench 10 may include a power cord for connecting to a source of AC power. As a further alternative, the impact wrench 10 may be configured to operate using a non-electrical power source (e.g., a pneumatic or hydraulic power source, etc.).

Referring to FIG. 2, the impact wrench 10 further includes a gear assembly 66 coupled to the output shaft 50 and a drive assembly 70 coupled to an output of the gear assembly 66. The gear assembly 66 may be configured in any of a number of different ways to provide a speed reduction between the output shaft 50 and an input of the drive assembly 70. The gear assembly 66 is at least partially housed within a gear case 74 fixed to the housing 14. In the illustrated embodiment, the gear case 74 includes an outer flange 78 that may be sandwiched between the front housing portion 22 and the motor housing portion 18. The fasteners that secure the front housing portion 22 to the motor housing portion 18 also pass through the outer flange 78 of the gear case 74 to fix the gear case 74 relative to the housing 14. In some embodiments, the gear case 74 may be at least partially defined by the front housing portion 22 and/or the motor housing portion 18.

The illustrated gear assembly 66 includes a pinion 82 formed on the output shaft 50, a plurality of planet gears 86 meshed with the pinion 82, and a ring gear 90 meshed with the planet gears 86 and rotationally fixed within the gear case 74. The planet gears 86 are mounted on a camshaft 94 of the drive assembly 70 such that the camshaft 94 acts as a planet carrier. Accordingly, rotation of the output shaft 50 rotates the planet gears 86, which then advance along the inner circumference of the ring gear 90 and thereby rotate the camshaft 94.

The drive assembly 70 further includes an anvil 98 and a hammer 102 supported on and axially slidable relative to the camshaft 94. The anvil 98 extends from the front housing portion 22. A tool element 99 can be coupled to the anvil 98 for performing work on a workpiece (e.g., a fastener, socket, bit, or the like) via a tool element retainer assembly 100. As described in greater detail below, the tool element retainer assembly 100 includes the anvil 98 and a retainer 101 receivable by the anvil 98.

The drive assembly 70 is configured to convert the constant rotational force or torque provided by motor 42 via the gear assembly 66 to a striking rotational force or intermittent applications of torque to the anvil 98 when the reaction torque on the anvil 98 (e.g., due to engagement between the tool element 99 and a fastener being worked upon) exceeds a certain threshold.

With continued reference to FIG. 2, the drive assembly 70 further includes a spring 106 biasing the hammer 102 toward the front of the impact wrench 10 (i.e., in the left direction of FIG. 2). In other words, the spring 106 biases the hammer 102 in an axial direction toward the anvil 98, along the axis 54. A thrust bearing 110 and a thrust washer 114 are positioned between the spring 106 and the hammer 102. The thrust bearing 110 and the thrust washer 114 allow for the spring 106 and the camshaft 94 to continue to rotate relative to the hammer 102 after each impact strike when lugs 112 on the hammer 102 engage with corresponding anvil lugs 120 and rotation of the hammer 102 momentarily stops. The camshaft 94 further includes cam grooves 124 in which corresponding cam balls (not shown) are received. The cam balls are in driving engagement with the hammer 102 and movement of the cam balls within the cam grooves 124 allows for relative axial movement of the hammer 102 along the camshaft 94 when the hammer lugs and the anvil lugs 120 are engaged and the camshaft 94 continues to rotate.

In operation of the impact wrench 10, an operator depresses the trigger switch 62 to activate the motor 42, which continuously drives the gear assembly 66 and the camshaft 94 via the output shaft 50. As the camshaft 94 rotates, the cam balls drive the hammer 102 to co-rotate with the camshaft 94, and the drive surfaces of hammer lugs engage, respectively, the driven surfaces of the anvil lugs 120 to provide an impact and to rotatably drive the anvil 98 and the tool element. After each impact, the hammer 102 moves or slides rearward along the camshaft 94, away from the anvil 98, so that the hammer lugs disengage the anvil lugs 120. As the hammer 102 moves rearward, the cam balls situated in the respective cam grooves 124 in the camshaft 94 move rearward in the cam grooves 124. The spring 106 stores some of the rearward energy of the hammer 102 to provide a return mechanism for the hammer 102. After the hammer lugs disengage the respective anvil lugs 120, the hammer 102 continues to rotate and moves or slides forwardly, toward the anvil 98, as the spring 106 releases its stored energy, until the drive surfaces of the hammer lugs re-engage the driven surfaces of the anvil lugs 120 to cause another impact.

Figure 3:
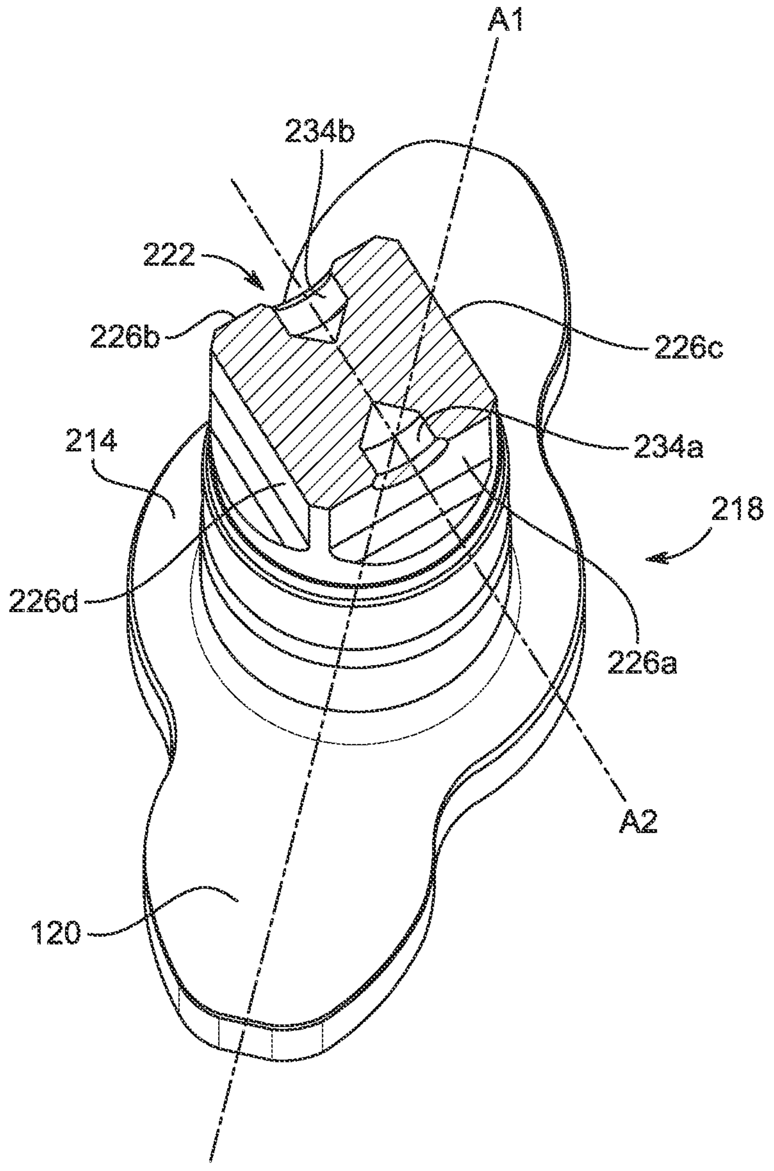
FIG. 3 is a perspective view of an anvil of the tool element retainer assembly of FIG. 2, taken along line 3-3 in FIG. 1.

FIG. 3 illustrates an embodiment of the anvil 98 in more detail. Although the anvil 98 is described above with reference to the impact wrench 10, the anvil 98 may be incorporated into other rotary impact tools. Furthermore, features of the anvil 98, and particularly tool element retaining features of the anvil 98 described in greater detail below, may be incorporated into other fastener driver tools, such as ratchet wrenches, socket-driving adapters for drills, and the like.

With reference to FIGS. 2 and 3, the anvil 98 includes a body 214 having an impact receiving portion 218 and a drive end portion 222 opposite the impact receiving portion 218. The drive end portion 222 of the anvil 98 has a generally polygonal (e.g., square, hexagonal, etc.) cross-sectional shape. In the illustrated embodiment, the drive end portion 222 includes four equal-length sides 226*a-d* that define the cross-section having a nominal size or width W (FIG. 2).

The drive end portion 222 is configured to interface with a tool element, such as the tool element 99 illustrated in FIGS. 1-2, so that that the tool element 99 is coupled for co-rotation with the anvil 98. More specifically, the tool element 99 includes a drive bore 228 (FIG. 2) with a shape and size corresponding to the shape and size of the drive end portion 222. As such, the drive end portion 222 of the anvil 98 is insertable into the drive bore 228 to couple the tool element 99 to the anvil 98.

The tool element 99 may be retained on the anvil 98 in different ways. For example, referring to FIGS. 2 and 3, the illustrated drive end portion 222 includes a recess 234 configured to align with a complimentary bore or opening 238 formed in the tool element 99. The illustrated recess 234 includes two blind bores 234*a*, 234*b* that extend inwardly from two opposite sides (e.g., side 226*b* and side 226*d*) of the drive end portion 222. As such, in the illustrated embodiment, the blind bores 234*a*, 234*b* each extend partially into the drive end portion 222. In other embodiments, the blind bores 234*a*, 234*b* may extend toward the axis 54 from any or all of the sides 226*a-d*. For example, blind bores 234*a*, 234*b* can extend inwardly from adjacent and/or perpendicular sides.

As best illustrated in FIG. 3, the blind bores 234*a*, 234*b* extend inwardly into the anvil 98 at an angle offset relative the anvil lugs 120. In other words, the anvil lugs 120 extend from the impact receiving portion 218 of the anvil 98 along a first axis A1, and the blind bores 234*a*, 234*b* extend into the drive end portion 222 of the anvil 98 along a second axis A2. In the illustrated embodiment, the first axis A1 and the second axis A2 are offset relative one another by an oblique angle. In the illustrated embodiments, the first axis A1 and the second axis A2 are offset relative one another by an acute angle. In some embodiments, the first axis A1 and the second axis A2 are offset relative one another by an approximately right angle.

Figure 4:
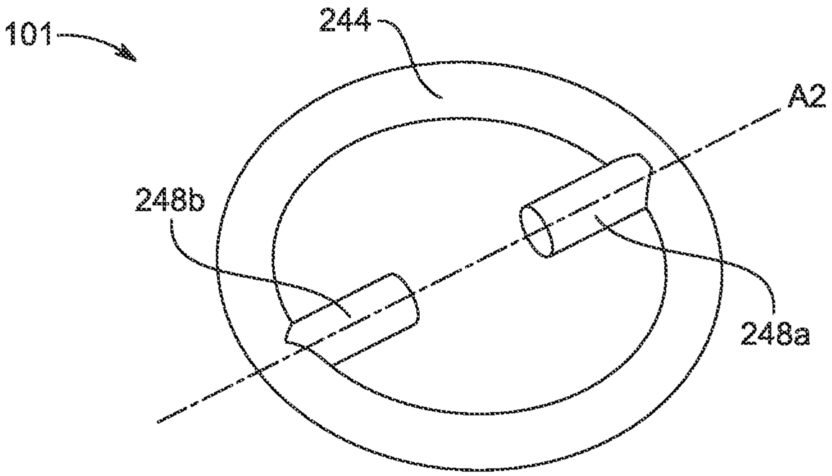
FIG. 4 is a perspective view of a retainer of the tool element retainer assembly of FIG. 2.

Referring now to FIG. 4, the retainer 101 of the tool element retainer assembly 100 may be referred to as a retainer ring 101. The retainer ring 101 includes an outer portion 244 and opposing posts 248*a*, 248*b* extending inwardly from the outer portion 244. The posts 248*a*, 248*b* may be inserted through the bore 238 (FIG. 2) of the tool element 99 and into the recess 234 (i.e. the blind bores 234*a*, 234*b*; FIG. 3) of the anvil 98 to retain the tool element 99 on the anvil 98 (FIGS. 1 and 2). The retainer ring 101 may be elastically deformed to stretch around the tool element 99, similar to an o-ring, and the posts 248*a*, 248*b* may be received by the recess 234. In the illustrated embodiment, the retainer ring 101 is made of rubber or another suitable high-strength elastic material. The posts 248*a*, 248*b* may be made of rubber (and may be integral with the outer portion 244 of the retainer ring 101), but may alternatively be made from or coated with a more rigid/less deformable material.

In general, the retainer ring 101 is received over the tool element 99 and by the anvil 98 to inhibit removal of the tool element 99 from a distal end (e.g., the drive end portion 222) of the anvil 98. More specifically, the posts 248*a*, 248*b* are each received through the bores 238 of the tool element 99 and in the respective blind bores 234*a*, 234*b* formed in the anvil 98. Stated another way, one or more of the posts 248*a*, 248*b* are extendable through the bore 238 of the tool element 99 and selectively engageable with one or more of the blind bores 234*a*, 234*b*. Because the blind bores 234*a*, 234*b* extend only partially into the anvil 98, the strength and toughness of the anvil 98 are increased compared to anvils that have a bore extending all the way (e.g., completely, continuously, etc.) through the drive end portion 222 of the anvil.

In some embodiments, the blind bores 234*a*, 234*b* each extend into the anvil 98 by less than half of the width W of the anvil 98. In some embodiments, the blind bores 234*a*, 234*b* each extend into the anvil 98 by approximately one quarter of the width W of the anvil 98. Accordingly, the posts 248*a*, 248*b* may be received by approximately half of the width W of the anvil 98. As illustrated in FIG. 4, the posts 248*a*, 248*b* extend along the common axis A2 with the blind bores 234*a*, 234*b*. As further illustrated in FIG. 4, a circumference of the retainer ring 101 (e.g., the outer portion 244) is continuous such that the outer portion 244 and the posts 248*a*, 248*b* form a retainer ring 101 that is unbroken and capable of surrounding an outer surface of the tool element 99. In the illustrated embodiment, the retainer assembly 100, specifically the outer portion 244 of the retainer ring 101, spans by an amount greater than the width W.

In operation, the posts 248*a*, 248*b* extend through the bores 238 of the tool element 99 and into the respective blind bores 234*a*, 234*b* to inhibit relative movement of the tool element 99 from the anvil 98 along the axis 54. The drive bore 228 of the tool element 99 and the drive end portion 222 of the anvil 98 are both generally polygonal to prevent relative movement (e.g., rotational slipping) between the anvil 98 and the tool element 99. As such, the non-circular geometry shared by the drive end portion 222 and the drive bore 228 provide co-rotation of the anvil 98 and the tool element 99. During installation or uninstallation, the tool element 99 is inserted over the anvil 98, and the retainer ring 101 is stretched over the tool element 99. Once the retainer ring 101 is positioned adjacent the drive end portion 222 of the anvil 98, the posts 248*a*, 248*b* may slide into the blind bores 234*a*, 234*b* through the bores 238 via a snap-like fit provided by a biasing force provided by elastic properties of the retainer ring 101. When the posts 248*a*, 248*b* are not received by the tool element 99 (e.g., bores 238) and in the blind bores 234*a*, 234*b*, the tool element 99 may be removed from the anvil 98 along the axis 54.

Figure 5:
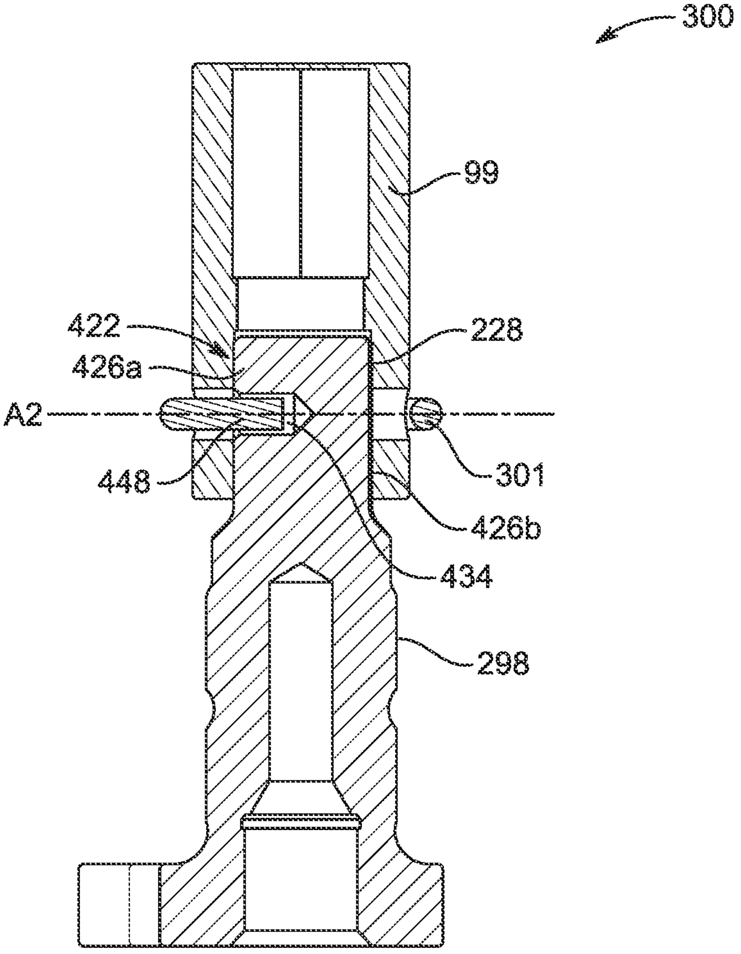
FIG. 5 is a cross-sectional view of a tool element retainer assembly, according to an embodiment of the present disclosure, that is usable with the impact tool of FIG. 1, taken along line 2-2 in FIG. 1.
Figure 6:
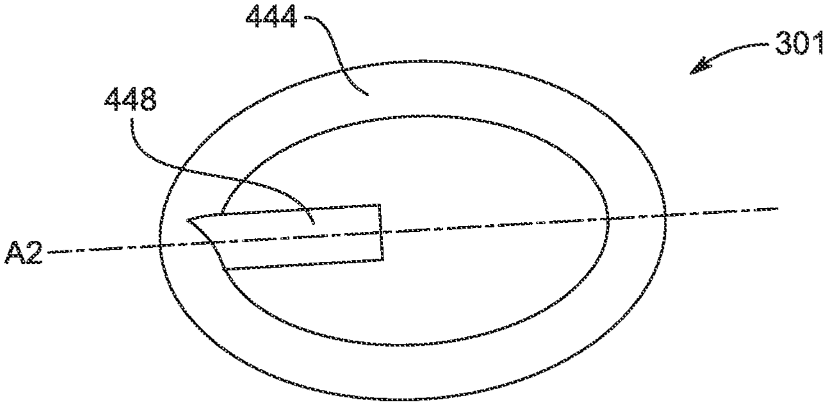
FIG. 6 is a perspective view of a retainer of the tool element retainer assembly of FIG. 5.

Referring now to FIGS. 5 and 6, an alternate tool element retainer assembly 300 useable with the impact tool 10 of FIG. 1 is described in detail. The tool element retainer assembly 300 of FIGS. 5 and 6 is similar to the tool element retainer assembly 100 of FIGS. 2-4 and will be identified with like reference numbers plus 200.

The tool element retainer assembly 300 includes an anvil 298, the tool element 99, and a retainer ring 301. The anvil 298 includes a single blind bore 434 extending into one of four sides 426*a*-426*d* of the anvil 298. The blind bore 434 is provided in a drive end portion 422 of the anvil 298 that is received in the drive bore 228 of the tool element 99. The blind bore 434 may extend into the anvil 298 along the second axis A2. In some embodiments, the second axis A2 is offset relative a horizontal plane (as defined in FIG. 5) such that the blind bore 434 may be angled upwardly or downwardly, with respect to FIG. 5.

As described above, the blind bore 434 receives a post 448 (FIG. 6) extending from the retainer ring 301. The post 448 extends inwardly from an outer wall 444 of the retainer ring 301, generally along the second axis A2, in order to be received in the blind bore 434. The retainer ring 301 further includes a continuous outer wall 444 such that an entire circumference of the retainer ring 301 is stretchable or deformable over the tool element 99 to install the retainer ring 301 over the tool element 99 and into the anvil 298.

In the illustrated embodiment of FIGS. 5 and 6, the post 448 extends into approximately half of the width W of the anvil 298, specifically the width W of the drive end portion 422 of the anvil 298. After installation of the retainer ring 301 onto the tool element 99 and anvil 298, the elasticity of the retainer ring 301 (e.g., outer wall 444) biases the post 448 toward the anvil 298 and into the blind bore 434.

Figure 7:
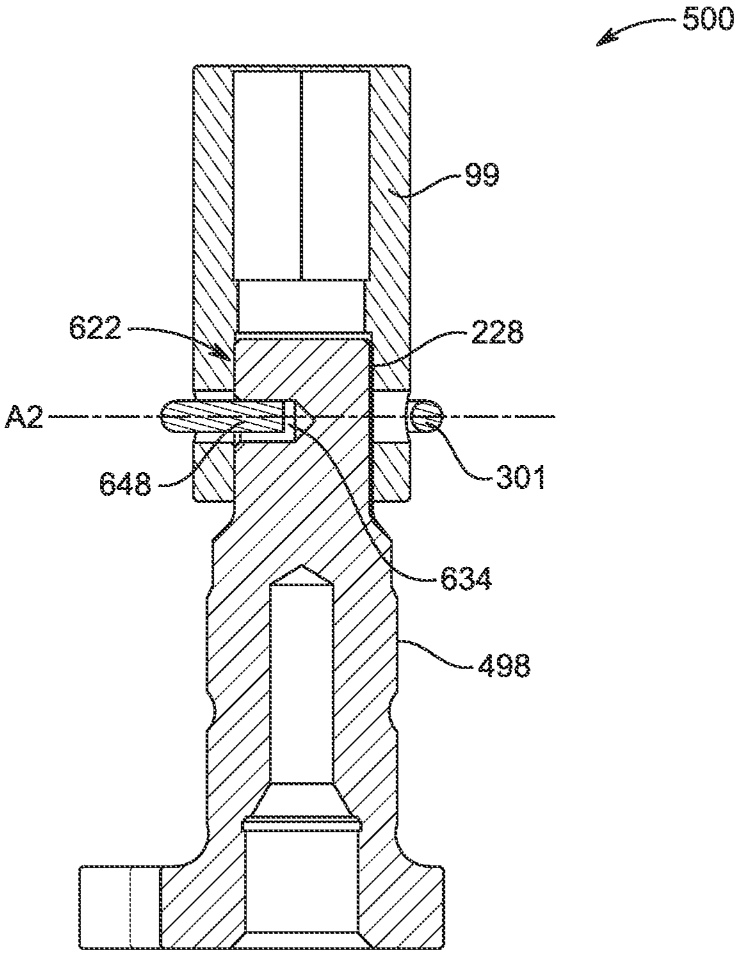
FIG. 7 is a cross-sectional view of a tool element retainer assembly, according to an embodiment of the present disclosure, that is usable with the impact tool of FIG. 1, taken along line 2-2 in FIG. 1.
Figure 8:
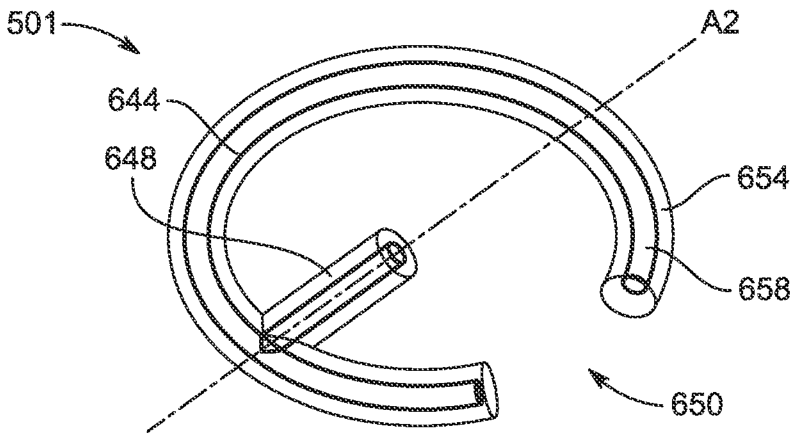
FIG. 8 is a perspective view of a retainer of the tool element retainer assembly of FIG. 8.
Figure 9:
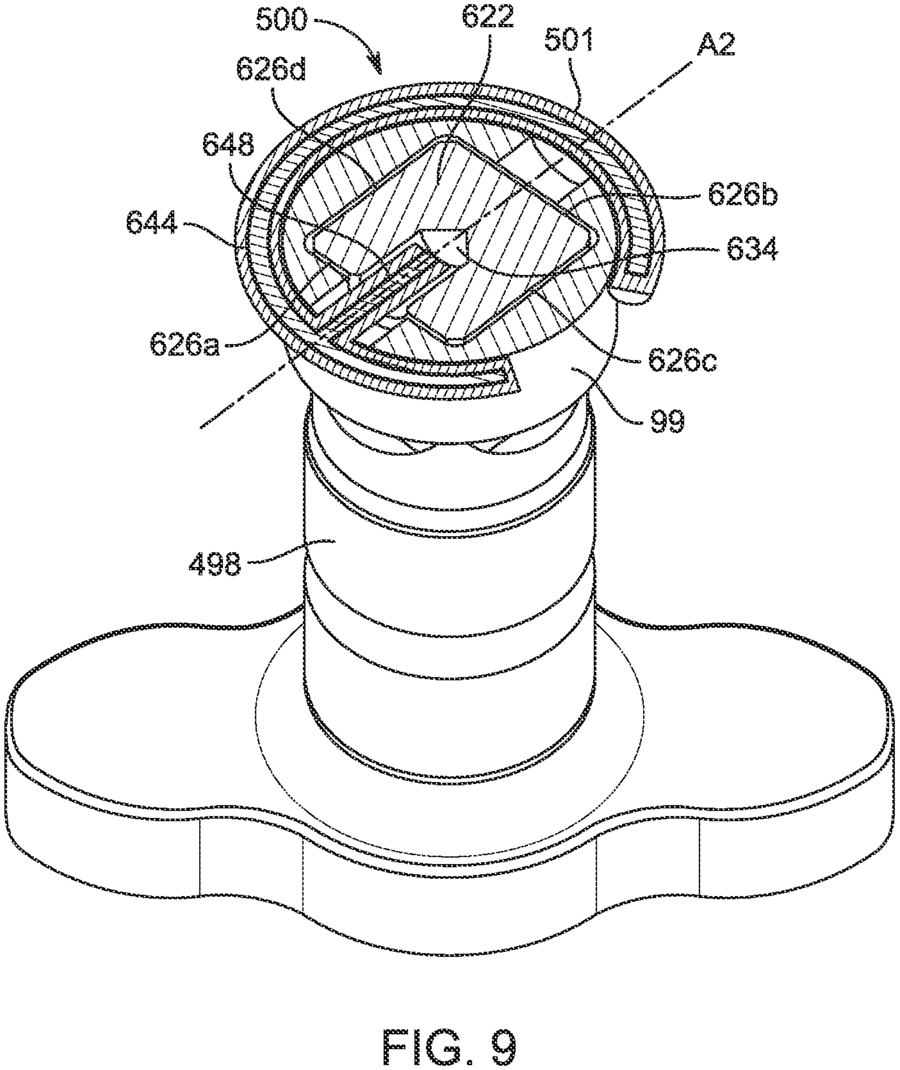
FIG. 9 is a cross-sectional view of the retainer assembly of FIG. 7, taken along line 3-3 in FIG. 1.

Referring now to FIGS. 7-9, an alternate tool element retainer assembly 500 useable with the impact tool 10 of FIG. 1 is described in detail. The tool element retainer assembly 500 of FIGS. 7-9 is similar to the tool element retainer assembly 100 of FIGS. 2-4 and will be identified with like reference numbers plus 400.

The tool element retainer assembly 500 includes an anvil 498, the tool element 99, and a retainer ring 501. The anvil 498 includes a single blind bore 634 extending into one of four sides 626*a*-626*d* of the anvil 498. The blind bore 634 is provided in a drive end portion 622 of the anvil 498 that is received in the drive bore 228 of the tool element 99. The blind bore 634 may extend into the anvil 498 along the second axis A2.

As described above, the blind bore 634 receives a post 648 (FIGS. 8 and 9) extending from the retainer ring 501.

The post 648 extends inwardly from an outer wall 644 of the retainer ring 301, generally along the second axis A2, in order to be received in the blind bore 434. The outer wall 644 of the retainer ring 501 includes a relief or gap 650 such that the outer wall 644 is not continuous so that the retainer ring 501 is stretchable or deformable over the tool element 99 to install the retainer ring 501 over the tool element 99 and into the anvil 498, or the retainer ring 501 can be opened to increase the gap 650 by an amount large enough to receive the tool element 99.

In the illustrated embodiment of FIGS. 7-9, the post 648 extends into approximately half of the width W of the anvil 498, specifically the width W of the drive end portion 622 of the anvil 498. After installation of the retainer ring 501 onto the tool element 99 and anvil 498, the elasticity of the retainer ring 501 (e.g., outer wall 644) biases the post 648 toward the anvil 498 and into the blind bore 634.

As further illustrated in FIGS. 8 and 9, the retainer ring 501 includes an elastic outer shell 654 and a reinforced inner core 658. The inner core 658 may have a greater hardness than the elastic outer shell 654 and/or be made of a different material (e.g., the elastic outer shell 654 may be made of rubber, and the inner core 658 may be made of a hard plastic, such as polyethylene, polypropylene, or the like). The outer shell 654 may be overmolded over the inner core 658. The inner core 658 runs through the outer wall 644 and through the post 648. Due to the gap 650 in the retainer ring 501, the inner core 658 is provided to increase the overall strength of the retainer ring 501, since the circumference of the outer wall 644 is not continuous. In the illustrated embodiment, the retainer ring 501 is deformable around the tool element 99, while in other embodiments, the retainer ring 501 includes a joint operable to snap the retainer ring 501 around/over the tool element 99 and the anvil 498.

Although the disclosure has been described in detail with reference to certain preferred embodiments, variations and modifications exist within the scope and spirit of one or more independent aspects of the disclosure as described. Various inventive features and advantages of the disclosure are set forth in the following claims.

What is claimed is:

1. An impact tool comprising:
- a housing;
- a motor supported within the housing;
- an anvil extending from the housing, the anvil including
  - a body rotatable about a longitudinal axis,
  - a drive end portion configured to receive a tool element over a distal end thereof,
  - an impact receiving portion opposite the drive end portion and including a pair of anvil lugs extending outwardly along a first axis, and
  - a blind bore extending partially through the drive end portion of the anvil in a direction along a second axis transverse to the longitudinal axis and obliquely oriented relative to the first axis;
- a retainer configured to at least partially surround the tool element, the retainer having a post configured to extend through the tool element and into the blind bore to inhibit removal of the tool element from the distal end of the anvil, wherein the retainer includes a circumference that is continuous and unbroken; and
- a drive assembly configured to convert a continuous rotational input from the motor to intermittent applications of torque to the anvil.

2. The impact tool of claim 1, wherein the blind bore is a first blind bore extending partially through a first side of the drive end portion, and wherein the anvil includes a second blind bore extending partially through a second side of the drive end portion.

3. The impact tool of claim 2, wherein the first side is opposite the second side.

4. The impact tool of claim 2, wherein the post is a first post, and wherein the retainer includes a second post configured to extend through the tool element and into the second blind bore.

5. The impact tool of claim 4, wherein the first side is opposite the second side.

6. The impact tool of claim 1, wherein the retainer is generally ring shaped.

7. The impact tool of claim 6, wherein the retainer has a continuous annular outer perimeter.

8. The impact tool of claim 6, wherein the retainer includes an outer perimeter defining a gap.

9. The impact tool of claim 1, wherein the retainer is made of rubber.

10. The impact tool of claim 1, wherein the retainer includes an outer shell and a reinforced inner core having a greater hardness than the outer shell.

11. An anvil for an impact tool, the anvil comprising:
- a body rotatable about a longitudinal axis;
- a drive end portion configured to receive a tool element over a distal end thereof;
- a first blind bore extending into the drive end portion of the anvil a first distance in a direction transverse to the longitudinal axis;
- a second blind bore extending into the drive end portion of the anvil a second distance in a direction transverse to the longitudinal axis and toward the first blind bore; and
- a retainer configured to at least partially surround the tool element, the retainer having a post configured to extend through the tool element and into one of the first blind bore and the second blind bore to inhibit removal of the tool element from the distal end of the anvil,
- wherein a sum of the first distance and the second distance is less than half a width of the drive end portion, and wherein the post is configured to extend into one of the first blind bore and the second blind bore a distance less than half the width of the drive end portion.

12. The anvil of claim 11, wherein the first blind bore extends partially through a first side of the drive end portion, and wherein the second blind bore extends partially through a second side of the drive end portion.

13. The anvil of claim 12, wherein the first side is opposite the second side.

14. The anvil of claim 12, wherein the post is a first post, and wherein the retainer includes a second post configured to extend through the tool element and into the second blind bore.

15. The anvil of claim 14, wherein the first side is opposite the second side.

16. The anvil of claim 11, wherein the retainer is generally ring shaped.

17. The impact tool anvil of claim 16, wherein the retainer has a continuous annular outer perimeter.

18. The anvil of claim 16, wherein the retainer includes an outer perimeter defining a gap.

19. The anvil of claim 11, wherein the retainer includes an outer shell and a reinforced inner core having a greater hardness than the outer shell.

20. An impact tool comprising:
- a housing;
- a motor supported within the housing;

an anvil extending from the housing, the anvil including
a body rotatable about a longitudinal axis,
a drive end portion configured to couple to a tool element, the tool element including an opening, and
a blind bore extending partially through the drive end portion of the anvil a first distance less than half a width of the drive end portion, wherein the blind bore is configured to align with the opening in the tool element when the tool element is coupled to the drive end portion;
a retainer configured to at least partially surround the tool element, the retainer having a post configured to extend through the opening and into the blind bore a second distance less than half the width of the drive end portion to inhibit removal of the tool element from the drive end portion of the anvil; and
a drive assembly configured to convert a continuous rotational input from the motor to intermittent applications of torque to the anvil.

* * * * *